United States Patent
Laboy

[19]
[11] Patent Number: 5,983,572
[45] Date of Patent: Nov. 16, 1999

[54] ROOF TIE-DOWN SUPPORT MEMBER

[75] Inventor: BernabéLaboy, Luquillo, Puerto Rico

[73] Assignees: Commonwealth of Puerto Rico, San Juan, Puerto Rico; Bernabe'Laboy, Luquillo, Puerto Rico; a part interest

[21] Appl. No.: 09/168,567

[22] Filed: Oct. 9, 1998

[51] Int. Cl.⁶ ..................................................... E04B 7/00
[52] U.S. Cl. .................................... 52/23; 52/3; 52/167.1; 52/DIG. 11; 52/DIG. 12
[58] Field of Search .................................. 52/3, 4, 23, 24, 52/167.1, 698, DIG. 11, DIG. 12

[56] References Cited

U.S. PATENT DOCUMENTS

| | | | |
|---|---|---|---|
| 269,018 | 12/1882 | Crowell et al. | 52/23 |
| 352,424 | 11/1886 | Owen et al. | 52/23 |
| 777,441 | 12/1904 | Small . | |
| 5,388,378 | 2/1995 | Frye | 52/23 |
| 5,522,184 | 6/1996 | Oviedo-Reyes . | |
| 5,537,786 | 7/1996 | Lozier et al. . | |
| 5,623,788 | 4/1997 | Bimberg et al. | 52/4 X |

*Primary Examiner*—Robert Canfield
*Attorney, Agent, or Firm*—Nils H. Ljungman and Associates

[57] ABSTRACT

A roof tie-down arrangement for preventing damage to a roof during high wind conditions of the type in which force is applied to hold down the roof via at least one cable and at least one support member. The support member has a pair of support legs for resting upon a roof surface which are connected by a channel-forming portion having a channel which runs lengthwise along the support member. This channel has a diameter that is appreciably greater than the diameter of the cable, has at least a portion which is open from above and is constructed for preventing the cable from lifting out of said the channel.

9 Claims, 3 Drawing Sheets

ROOF TIE-DOWN SUPPORT MEMBER

BACKGROUND OF INVENTION

1. Field of Invention

The present invention relates to a roof support that protects and preserves the roof of a dwelling, business, garage, etc., during high wind conditions. Specifically, the invention relates to metal cable support member which receives a tie-down member that is strapped across the length and/or breath of a roof of a building structure, applying a downward force to the roof being protected. The cable support member prevents extensive damage to a roof by reducing the likelihood that the roof will be separated from the rest of the building during high wind conditions.

2. Description of Related Art

During high wind conditions (i.e. hurricanes, tornados, etc.,) it is possible for all or part of the roof of a building structure to be separated from the rest of the main building due to the lifting effect created as the wind passes over the roof at very high speeds. It has been determined that the most serious damage to a building occurs when the entire roof separates from the building. In geographic areas such as coastal regions where such high winds are a common occurrence, the modern trend has been to use some type of additional roof support besides the typical nail-down method.

An example of such a technique is demonstrated in U.S. Pat. No. 5,537,786 to Lozier et al. which discloses the use of tie-down straps, and a plurality of anchors to secure the roof of the dwelling. The straps are connected to anchors placed on opposite sides of the building and secured to the foundation. The strap and anchor configuration includes a ratchet as a tension adjusting device that permits the straps to be tightened against the roof. This invention is designed to guide the straps but does not prevent the straps from being separated from the guide. Therefore, there is always the risk that the straps could be separated from the guide during use.

U.S. Pat. No. 5,522,184 to Oviedo-Reyes discloses an apparatus for strengthening a building against hurricanes and wind storms using a net member placed over the roof and held in place by cables and several support beams. Anchorage assemblies keep the support beam members in place and tension adjusting devices are used to tighten the cables against the structure being protected. However, because this arrangement requires the use of a net member, and elaborate cable and anchor assemblies to support the building, it is difficult to install and use.

U.S. Pat. No. 777,441 to Small discloses a device for guiding and supporting anchoring-cables employed to hold the roof of a building to prevent its destruction by wind storms. This device consists of a base plate that is secured to the roof with a pivoting block attached to each plate. The block has a longitudinal groove in its outer face for receiving a anchoring-cable that is anchored on both ends and passed over the block. Because this device requires that the base plates be nailed to the roof, it results in minor roof damage that leads to roof leaks if not properly repaired.

Although these inventions may have been useful as roof supports on various types of dwellings and businesses, they do not represent the most efficient and economical way of achieving the desired results.

SUMMARY OF THE INVENTION

It is one of the primary objects of the present invention to provide a cable support member made from some type of metal or cast material that is capable of supporting and preserving a roof, such as zinc unions and cardboard or other roof panels of a dwelling, business, garage, etc., during high wind conditions (i.e., hurricanes, tornados, etc.,).

It is another object of the present invention is to provide a cable support member for a building structure that is portable, removable, and reusable for dwelling and businesses and which itself does not damage the roof being protected.

It is another object of the present invention to provide a roof support for a building structure that is easy to use and store.

It is another object of the present invention to provide a roof support device for a building structure that is inexpensive and easy to manufacture.

In its preferred form, the present invention is a cable support member for a building structure that is shaped to conform with the roof contour, so that it engages over roof corrugations or can rest on the surface of a flat roof. The cable support member has a channel through which a tension cable can be passed for exerting a force downward on the roof. The tension cable is free to move longitudinally, but is restrained so that it cannot be lifted up and out of the channel of the cable support member.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
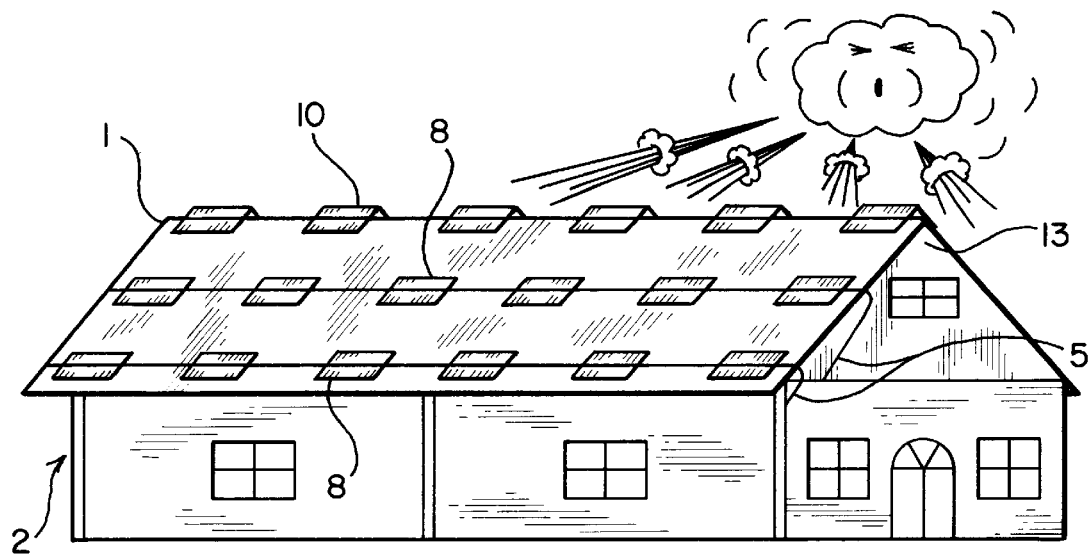
FIG. 1 is a perspective view that schematically represents a dwelling with the roof structure supported by cable support members in accordance with the present invention.

Referring now to FIG. 1, a typical dwelling house 2 is represented as having its roof structure 1 held in place against the force of strong winds by a plurality of support members (also known as spider grips) 8 & 10 together with cables 5 that are stretched longitudinally across the roof structure 1 over the support members 8, 10.

Figure 2:
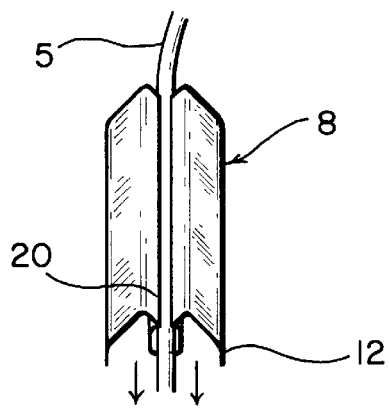
FIG. 2 is a perspective view from the top of a support member with a cable running longitudinally through the support member.
Figure 3:
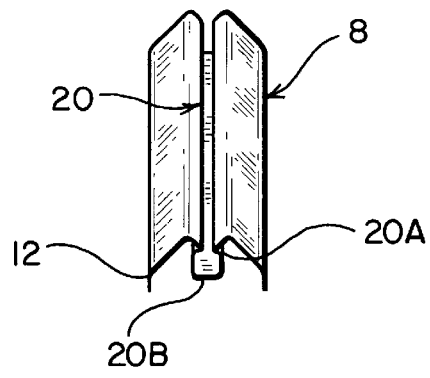
FIG. 3 is a perspective view of the support member of FIG. 2 without the cable.

In the preferred forms, a first of which is shown in FIGS. 2 & 3, the support members 8 & 10 have legs 12 that are shaped to conform with the contour of the roof structure 1 on which they are to rest. In this case, the lower edges of the legs 12 are straight for enabling the legs to rest edgewise on a flat roof surface, including one which is sloping as shown in FIG. 1. The support members 8 & 10 are held tightly in place by cables 5 that are anchored to the dwelling house using a method not illustrated here but well known in the art.

FIG. 2 shows a first embodiment of the support member 8 with a cable 5 running longitudinally through a channel 20 that is open at the top of the support member 8. FIG. 3 shows in more detail the channel 20 that runs through the support member 8 which is open at the top and runs longitudinally through the member 8. The channel shown in FIG. 3 is designed to be narrow enough at the open top 20A to keep the cable from pulling out of the channel 20, but is wide enough at the bottom 20B to allow the cable to move freely through the channel 20 in the longitudinal direction. Specifically, the opening at the top of the channel 20A has a width that is less than the diameter of the cable 5 while the channel itself has a diameter that is appreciably greater than the diameter of the cable 5. With this channel design, a number of support members 8 can be strung on the cable prior to stringing of the cable 5 across the roof, thereby facilitating carrying of the overall assembly and positioning of each support followed by tightening of the cable since the cable 5 will not dislodge itself from the supports. Furthermore, the configuration illustrated is well suited to manufacture of the supports by simple stamping and bending operations performed on standard sheet stock material; although, production of the supports 8 by casting or extrusion techniques is also possible.

Figure 4:
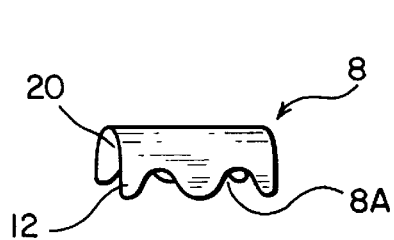
FIG. 4 is a perspective view from the side of a support member with a sinusoidal-shaped bottom surface.
Figure 5:
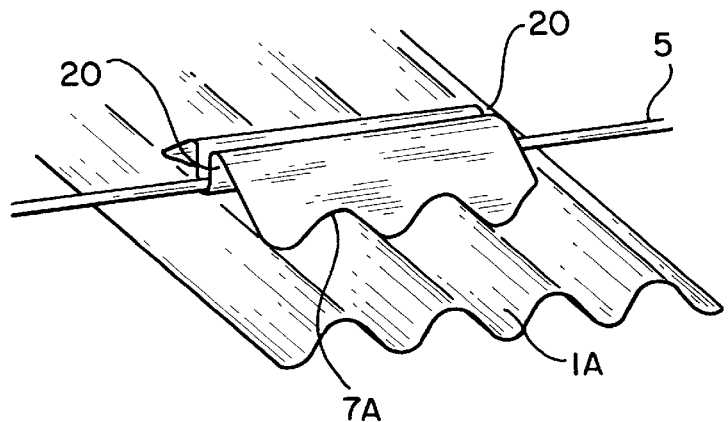
FIG. 5 is a perspective view from the top of the FIG. 4 support member on a sinusoidal-shaped roof structure.

FIG. 4 shows a modified embodiment of the support member 8 wherein bottom edges 8A of the pair of support legs 12 have a sinusoidal shape member designed to engage over the ridges a sinusoidal shaped corrugated roof structure 1A as shown in FIG. 5. Apart from this difference, this embodiment is otherwise the same as that of FIGS. 2 & 3.

Figure 6:
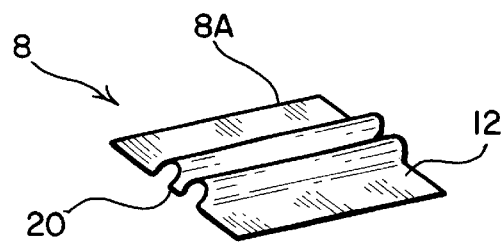
FIG. 6 is a perspective view from the top of a support member with a flat bottom surface.

FIG. 6 shows another embodiment of the support member 8 which differs from those describes so far in that the legs 12 have been bent outwardly so as to cause the outer edge portions 8A to lie in the same plane. This configuration provides the support member a flat bottom surface of the support member 8A suitable for resting on the flat surface of a roof having a horizontal, flat roof surface.

Figure 8:
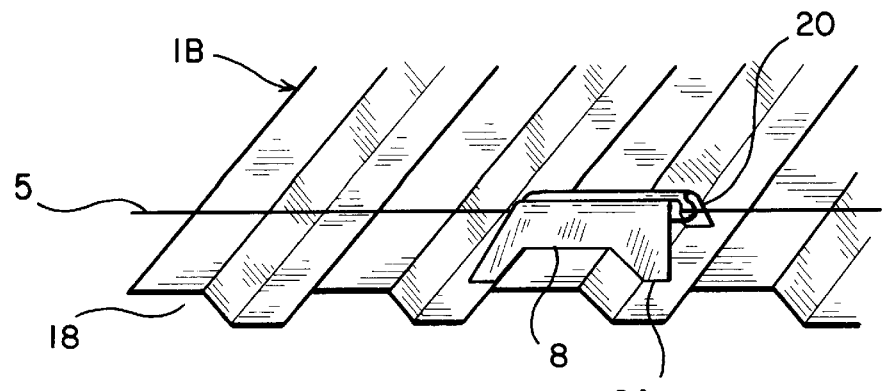
FIG. 8 shows the support member of FIG. 7 securing a corrugated roof structure.
Figure 7:
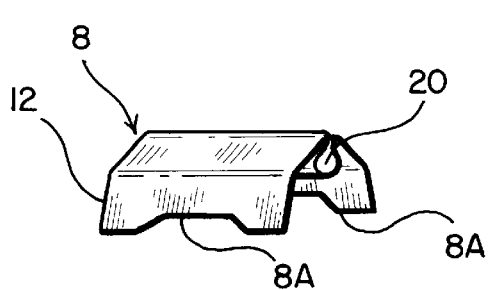
FIG. 7 is a perspective view from the side of a support member with a corrugated bottom surface.

FIG. 7 shows a further embodiment of the support member 8 wherein the support legs 12 are provided with a bottom surface 8A with a trapezoidal cutout designed to engages the contour of a corrugated roof 1B (FIG. 8). Apart from this change, again, this embodiment is otherwise the same as those described above from a standpoint of cable channel 20 and the manner in which it is produced and used.

Figure 9:
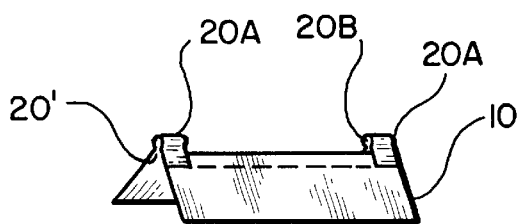
FIG. 9 is a perspective view from the side of an A-shaped support member.
Figure 10:
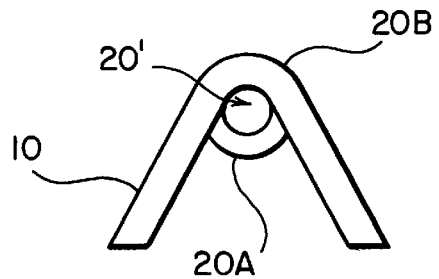
FIG. 10 is a side elevational view of an A-shaped support member from the front.
Figure 11:
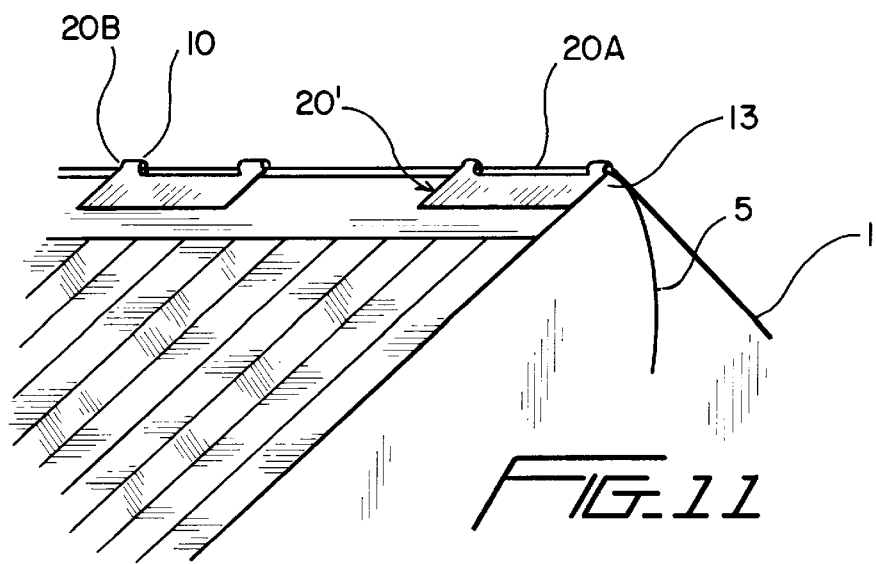
FIG. 11 is perspective view showing two of the FIG. 9 A-shaped support members securing the peak of a roof structure.

FIGS. 9 & 10 show an embodiment of the support member 10 which differs from those described so far in that it is design for use at a roof peak (see FIGS. 1 & 11) and in the nature of the cable channel 20'. In its preferred form, the support member of this embodiment is an A-shaped piece of metal for engaging opposite sides of a roof peak and which has a channel 20' running longitudinally along the top end thereof. The channel 20' has end portions 20B that are closed from above at on both ends the support member 10 and a central portion 20A that open from above. Specifically, the top of the channel end portions 20B is formed by the continuous metal body of the support member 10 that has been bent over to form the A-shape of the support member 10. The middle portion 20A is formed from a portion of the metal body of the support member 10 that has been bent into a partially cylindrical shape to form the bottom of the channel between two transverse slots that have been cut into the support member to define the inner sides of the end portions 20B. The cable 5 is passed under a first of the end portions 20B, above the middle portion 20A and finally out under the other end portion 20B. In this way, the cable is held from lifting upwardly out of channel 20' by the outer portions while the middle portion 20B provides a supporting surface for the bottom of the cable as it runs longitudinally through the support member 10. FIG. 10 shows a front view of the A-shaped support member 10 which illustrates how the channel 20' will encircle the cable by the combined effects of portions 20A and 20B. FIG. 11 shows support members 10 engaging the contour of a roof peak and a cable 5 passing longitudinally through the channel 20' of multiple support members 10 for securing them to the roof structure.

With this embodiment, as with the other embodiments, the support member is easily and inexpensively produced from sheet stock material. Furthermore, like the prior embodiments, multiple support members can be strung on the cable in advance, thereby facilitating quick installation with out problems associated with having to either fix the support members to the roof in advance or worry about the cable dislodging from the support members. It should also be appreciated that the configuration of channel 20' can be used with the various forms of support member 8 instead of the type of channel 20 shown in use there or that a peak support member 10 could be provided with the continuous open top channel 20 instead of the segmented channel 20'. Also, with the exception of the embodiment of FIG. 6, the channel-forming portion of the cable support members have a top surface that is nestable within the underside of another like cable support member so as to be able stacking of a plurality of said cable support members when they are not in active use.

Therefore, even though the present invention has been shown and described with reference to the following preferred embodiments, it will be apparent to those skilled in the art that other changes in form and detail may be made without departing from the scope and spirit of the invention as defined in the following claims.

I claim:

1. A roof tie-down arrangement for preventing damage to a roof during high wind conditions, comprising at least one cable strung with rough and at least one support member, said at least one support member comprising a pair of support legs for resting upon a roof surface, said legs being connected by a channel-forming portion having a channel which runs lengthwise along the support member; wherein said channel has a diameter that is appreciably greater than the diameter of said at least one cable, has at least a portion which is open from above and has means for preventing said cable from lifting out of said the channel.

2. A roof tie-down arrangement as set forth in claim 1, wherein the channel has an opening running along the full length of a top side thereof; and wherein said means for preventing the cable from lifting out of said channel comprises the opening having a width which is appreciably smaller than the diameter of said cable.

3. A roof tie-down arrangement according to claim 1, wherein said support member is generally A-shaped, a central portion of an apex of the A-shape being downwardly curved to form the upwardly open portion of said channel; and wherein said means for preventing comprises longitudinal end portions of the A-shape of the support member channel under which the said cable passes into and out of the channel.

4. A roof tie-down arrangement as set forth in claim 1, wherein said cable is strung through a plurality of said support members.

5. A roof tie-down arrangement as set forth in claim 1, wherein the channel-forming portion of said support member has a top surface that is nestable within an underside of another like support member so as to enable stacking of a plurality of said support members.

6. A roof tie-down arrangement as set forth in claim 1, wherein the support member has a pair of legs, each of which has a sinusoidally shaped bottom edge for engaging over sinusoidally shaped roof structures.

7. A roof tie-down arrangement as set forth in claim 1, wherein the support member has a pair of legs, each of which has a flat bottom surface portion for engaging on flat roof structures.

8. A roof tie-down arrangement as set forth in claim 1, wherein the support member has a pair of legs, each of which has a bottom portion with a trapezoidal cut out for engaging over a corrugated roof structure.

9. A roof tie-down arrangement as set forth in claim 1, wherein the support member has an A-shape for engaging over the peak of a roof structure.

\* \* \* \* \*

UNITED STATES PATENT AND TRADEMARK OFFICE
CERTIFICATE OF CORRECTION

PATENT NO. : 5,983,572
DATED : November 16, 1999
INVENTOR(S) : Bernabe' LABOY

It is certified that error appears in the above-indentified patent and that said Letters Patent is hereby corrected as shown below:

In column 4, line 50, Claim 1, after 'strung', delete "with rough and" and insert --through--.

Signed and Sealed this

Twentieth Day of February, 2001

Attest:

NICHOLAS P. GODICI

Attesting Officer     Acting Director of the United States Patent and Trademark Office